US007419188B2

(12) United States Patent
Nicolai et al.

(10) Patent No.: US 7,419,188 B2
(45) Date of Patent: Sep. 2, 2008

(54) VEHICLE UNDERSHIELD

(75) Inventors: Norbert Nicolai, Schermbeck (DE); Nelson Dias, Meschede (DE)

(73) Assignee: Entwicklungsgesellschaft fuer Akustik (EFA) mit Beschraenkter Haftung, Witten (DE)

( * ) Notice: Subject to any disclaimer, the term of this patent is extended or adjusted under 35 U.S.C. 154(b) by 0 days.

(21) Appl. No.: 10/483,164

(22) PCT Filed: Jul. 9, 2002

(86) PCT No.: PCT/EP02/07612

§ 371 (c)(1), (2), (4) Date: Aug. 9, 2004

(87) PCT Pub. No.: WO03/006303

PCT Pub. Date: Jan. 23, 2003

(65) Prior Publication Data

US 2004/0262906 A1   Dec. 30, 2004

(30) Foreign Application Priority Data

Jul. 10, 2001   (DE) ............................ 101 33 425

(51) Int. Cl.
*B62D 25/18* (2006.01)

(52) U.S. Cl. .................. 280/847; 280/851; 280/160; 296/198

(58) Field of Classification Search ............... 280/848, 280/847, 851, 854, 156, 160, 849, 152.2; 293/4, DIG. 1; 523/212, 213; 296/198, 39.1
See application file for complete search history.

(56) References Cited

U.S. PATENT DOCUMENTS

| 1,699,572 | A | * | 1/1929 | Scheid | 280/848 |
|---|---|---|---|---|---|
| 1,704,048 | A | * | 3/1929 | Jordan | 280/847 |
| 2,181,367 | A | * | 11/1939 | Fergueson | 280/848 |
| RE24,339 | E | * | 7/1957 | Pere | 280/847 |
| 3,834,732 | A | * | 9/1974 | Schons | 280/851 |
| 3,942,603 | A | * | 3/1976 | Pesonen | 293/4 |
| 4,041,823 | A | * | 8/1977 | Ashbrook | 83/478 |
| 4,205,861 | A | * | 6/1980 | Roberts et al. | 280/851 |
| 4,337,192 | A | * | 6/1982 | Campbell | 523/212 |

(Continued)

FOREIGN PATENT DOCUMENTS

DE   29 08 837 A1   9/1980

(Continued)

OTHER PUBLICATIONS

International Search Report for PCT/EP02/07612; ISA/EPO; Mailed: Nov. 8, 2002.

*Primary Examiner*—Hau Phan
(74) *Attorney, Agent, or Firm*—Harness, Dickey & Pierce, PLC

(57) ABSTRACT

A vehicle undershield is disclosed which is made from a material which is essentially conformed to the shape of the wheel housing and attached thereto, which undershield, due to its shape and structure, provides protection from corrosion by the sandblasting effect, causes reduction of the spray mist occurring on road surfaces wet from rain, and an effective noise damping on roads wet from rain and also on dry roads, having a sound-absorbing design for air-borne sound coming from the side facing away from the wheel, having a very good self-cleaning effect, while having a low weight of the constructional part.

20 Claims, 1 Drawing Sheet

U.S. PATENT DOCUMENTS

Figure 1:
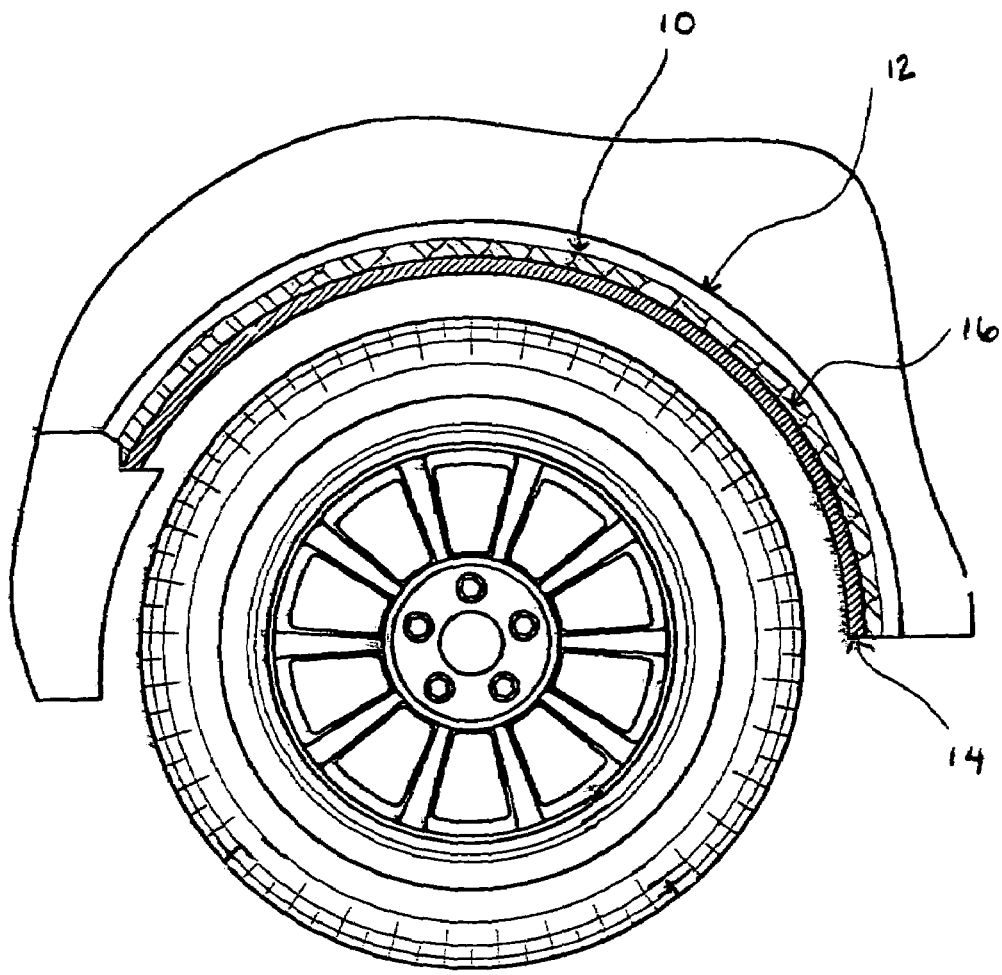

| | | | | |
|---|---|---|---|---|
| 4,427,208 A | * | 1/1984 | Jurges | 280/848 |
| 4,735,427 A | * | 4/1988 | Fuchs | 280/847 |
| 5,000,483 A | * | 3/1991 | Blumel et al. | 280/847 |
| 5,207,455 A | * | 5/1993 | Gotz et al. | 280/848 |
| 5,280,960 A | * | 1/1994 | Casey | 280/848 |
| 5,326,135 A | * | 7/1994 | Nakayama et al. | 280/850 |
| 5,460,411 A | * | 10/1995 | Becker | 280/851 |
| 5,462,331 A | * | 10/1995 | Stief et al. | 280/847 |
| 6,086,104 A | * | 7/2000 | Marchisio et al. | 280/851 |
| 6,799,782 B2 | * | 10/2004 | Jain et al. | 280/848 |
| 6,953,205 B2 | * | 10/2005 | Friest et al. | 280/770 |

FOREIGN PATENT DOCUMENTS

| | | |
|---|---|---|
| DE | 30 07 760 A1 | 9/1980 |
| DE | 33 43 402 A1 | 6/1985 |
| DE | 34 28 906 A1 | 2/1986 |
| DE | 35 39 146 A1 | 5/1987 |
| DE | 39 03 471 A1 | 8/1989 |
| DE | 42 40 935 A | 6/1994 |
| DE | 44 15 983 A1 | 11/1995 |
| DE | 44 43 678 A1 | 6/1996 |
| DE | 196 34 615 A1 | 3/1998 |
| DE | 298 07 563 U1 | 8/1998 |
| DE | 197 29 804 A1 | 1/1999 |
| DE | 198 17 567 A1 | 11/1999 |
| DE | 199 30 762 A1 | 12/1999 |
| DE | 299 16 210 U1 | 1/2000 |
| DE | 100 01 313 A | 7/2001 |
| DE | 100 24 496 A | 11/2001 |
| EP | 0 091 419 A2 | 10/1983 |
| EP | 0 222 193 A3 | 5/1987 |
| EP | 0 810 145 A | 12/1997 |
| WO | 01 92085 A | 12/2001 |

* cited by examiner

VEHICLE UNDERSHIELD

The present invention relates to a vehicle undershield consisting of a material which is essentially conformed to the shape of the wheel housing and attached thereto, which undershield, due to its shape and structure, provides protection from corrosion by the sandblasting effect, causes reduction of the spray mist occurring on road surfaces wet from rain, and an effective noise damping also on dry roads.

Vehicle undershields made of plastics which are applied to the outer side (facing the tire) of wheel housings can serve various functions.

Thus, for example, from DE 29 08 837 A1 and DE 30 07 760 A1, undershields are known which protect underlying metallic materials from gravel impact, dirt and moisture and thus serve for corrosion protection. These constructional parts are prepared by an injection molding method from a plastic material, preferably polypropylene, which may optionally be filled with minerals or chemically modified. One-layered constructional parts prepared in this way have a very high weight per unit area and additionally have the drawback that their absorptivity for air-borne or structure-borne noise is very low. Thus, noises occurring in the wheel housings are conducted into the passenger compartment almost without damping, while air-borne noise coming from inside the vehicle is reflected at the undershields having such a design, which increases the noise pollution in the interior.

Noises which are generated in the wheel housings in this sense are primarily tire noises on a dry road surface and, on road surfaces wet from rain, noises generated by the impact of splash water (road spray) on the outer surfaces of the wheel housing or undershields, further engine noises (air-borne noise) which are reflected at these surfaces and thus become enhanced or find their way into the interior through the constructional part and the points of attachment.

However, it is worth mentioning that the smooth and water-repelling surface of these constructional parts ensures a low water uptake and a very good self-cleaning of these constructional parts. Developments of the principle of one-layered undershields based on plastic materials which additionally have a noise-reducing function have been described in DE 34 28 906 A1 and in DE 33 43 402 A1. The noise-damping effect is ensured therein by a vibration-damped or elastic attachment of the undershield to the car body and by a viscoelastic plastic material which is reinforced with mineral fillers. In addition, these undershields have V-shaped grooves running in the running direction of the wheel, or spherical recesses which cause swirling of the impinging spray water, prevent the occurrence of spray mist, and additionally offer noise protection against lower frequencies as a hollow chamber resonator. A weight saving as compared to elements of this kind is realized in DE 198 17 567 C2 in that the plastic material reinforced by mineral fillers serves only as a skeleton which supports a textile plastic material with a carpet-like surface, for example fibrous webs, in the recessed surface regions.

A similar idea is the basis of DE 199 30 762 A1 which describes a light-weight framework of plastic having a plastic sheet applied to the back side, optionally with a plastic double sheet in a sandwich construction mode, or such a framework which is covered on both sides with a corresponding plastic sheet which leaves a space. In addition to spray water and corrosion protection, noise damping is achieved here by a flexible sheet. However, a special equipment which causes protection from spray mist formation is not described.

By using the same plastic material for both surface regions (textile and skeleton), a high reusability of the materials is to be ensured. However, drawbacks thereof are various modifications of the plastic material of the skeleton surface regions as well as the complicated structure of these undershields, which substantially complicates the separation of the different plastic materials.

DE 196 34 615 A1 and DE 197 29 804 A1 describe sound-absorbing constructional parts in which chambers have thin side walls and form acoustic resonators, so-called chamber or Helmholtz resonators. In deep-drawing processes, they are prepared from sheets with a grid and are optionally additionally coated with polypropylene-coated aluminum ribbons or damping webs. These constructional parts primarily serve as a hood absorber and have the critical disadvantage of being complicated and accordingly expensive to produce and have a high space demand.

Further drawbacks include the facts that a reinforcing grid is required for mechanical stability, and that the sound absorption with Helmholtz resonators is effective only in a very small frequency range which cannot be changed. Helmholtz resonators or perforated absorbers are also used in a sound-insulating cladding according to DE 44 15 983 A1, which is a multilayered arrangement with a segment filled with a sound-absorbing material surrounded by non-flexible (plastic/metal) or flexible (rubber, plastic) materials. In the latter case, substantial self-cleaning as well as good sound absorption can be achieved by pressurizing with compressed air. Further, it is proposed to apply a flexible water-impermeable sheet or additional tube absorbers. However, the complicated structure as well as the poor reusability due to the use of very different materials conflict with the industrial-scale use of these claddings.

EP 0 091 419 A2 describes a multilayered laminated plastic cladding, especially for trucks, which consists of a core layer, for example, a non-woven fabric with an adhesive layer, and a grass-like layer of plastic non-adhesively connected therewith through a polymeric intermediate layer. This cladding offers a mechanically resistant protection against corrosion and sandblasting effect in a wide range of temperatures, and especially against spray mist formation due to the grass-like layer. However, the preparation method is also very complicated and has a limited application due to the poor deformability of the materials.

Open-pore materials consisting of textile webs, plastic foam or bristles which are applied as undershields to the wheel housing through detachable or non-detachable bonds have already been described in some cases as materials for noise-damping undershields. Thus, DE 299 16 210 U1 describes a supporting plastic part, for example, an undershield with a pile web applied to the top or bottom side. An undershield consisting of a binder-bonded self-supporting needle-punched web was described as a noise-damping cladding which in addition is to provide protection against spray mist formation.

DE 298 07 563 U1 also describes a non-woven fabric bonded with a plastic material as a noise-reducing coating on a supporting part of thermoformable injection-moldable thermoplastics as an undershield, which is anchored within the wheel housing for noise damping through an elastic connection. However, these constructional parts, which have open-pore materials for sound absorption, such as non-woven fabrics, on the side of the undershield facing towards the wheel, can come into direct contact with water. Here, the sound-absorbing open-pore property and large surface area of the materials has a disadvantageous effect because the constructional parts can incorporate twice to three times their weight of water, especially when frozen, and the formation of an ice layer on such surfaces is favored, so that the weight can be five to six times as high in this case. Further, the whole wheel housing can freeze over, and when the wheel moves against the spring, the undershield may be torn out due to the good connection between the ice layer and the non-woven. Dirt and mud particles, which accumulate in porous non-woven materials in the course of time, have a similar disadvantageous effect.

DE 35 39 146 A1 (EP 0 222 193 A3) proposes an undershield which consists of a shell of a needle-punched plastic fibrous web which has been made water-impermeable on the back side by a plastic coating and is optionally provided with a water-impermeable coating of an elastic plastic material on the side facing towards the wheel. Alternatively, an undershield consisting of a support material which is covered by a plastic fibrous web on both sides thereof has also been described. Due to the multilayered structure, these constructional parts have an unfavorably high weight; they are complicated to produce and hardly reusable.

A sound-absorbing spray water protection cladding which avoids the drawback of the open-pore non-wovens is also described in DE 44 43 678 A1. In this case, the spray water cladding consists of a composite layer structure with an impact-resistant sound-permeable spray protection layer and a sound-absorbing layer of an absorber mat which consists, for example, of an open-pore plastic foam mat or of resonators or membrane absorbers. Recesses with an open ground can be provided here in the outer sound-permeable spray protection layer for sound absorption and as a spray mist protection. According to this document, the impact-resistant sound-permeable spray protection layer may also be replaced by a non-woven. One drawback of a corresponding undershield is that a third layer is necessary for mechanical strength, which renders preparation and, in particular, reuse significantly more complicated.

Generally, the recycling of the constructional parts which use non-wovens or foams for acoustic reasons is complicated. On the one hand, this is because only very little non-woven recycled from reuse, or none at all, can be employed, to ensure a reproducible color, which is necessary for visible parts, and on the other hand, this is because the impregnation and other plastic materials employed often do not consist of the same thermoplastic material as the fibers. This impregnation with mostly thermosetting plastic materials is necessary for many fibrous webs, especially when some rigidity is to be achieved. In this case, the lower degree of sound absorption is a disadvantage as compared with a non-woven which is not bonded with a binder.

Thus, it was the object of the present invention to provide a vehicle undershield which ensures protection from corrosion and the sandblasting effect caused by the spray water, offers an effective sound absorption with respect to structure-borne and air-borne sounds from outside, and avoids the reflection of sound impinging on the undershield from the interior, or absorbs sound.

The constructional parts are to be readily prepared, have a low weight per unit area and be completely reusable.

DRAWING

FIG. 1 is an assembled view of the vehicle undershield applied to an automotive vehicle.

In a first embodiment, this object is achieved by a vehicle undershield (10) which is essentially conformed to the shape of the wheel housing (12) and attached thereto, characterized by a water-repellent self-supporting plastic sheet (14) on the side facing towards the wheel, and of a non-woven (16) made of plastic fibers on the side facing away from the wheel, and in that said plastic fibers preferably consist of the same material, which may be a thermoplastic material, in particular.

By such a composite, the excitation of structure-borne sound, for example, by spray water or gravel impact, is absorbed by the high internal loss factor and modulus of elasticity due to the spring/mass construction, and the undamped reflection of sound from the interior back into the interior is avoided. The smooth surface of the water-repellent self-supporting plastic sheet ensures a good self-cleaning and low uptake of water. The two-layered structure with the use of a non-woven having a high sound absorption property is enabled by the use of the self-supporting water-repellent sheet.

A complete and simple reuse is achieved by using the same plastic material for the plastic sheet and the plastic fibers of the non-woven, especially needle-punched web, so that the materials can be recovered by simply melting the constructional part and again extruding or injection-molding the material.

In a further embodiment, the vehicle undershield is essentially conformed to the shape of the wheel housing and attached thereto. It is characterized by consisting of a water-repellent self-supporting plastic sheet on the side facing towards the wheel, and of a needle-punched web made of plastic fibers on the side facing away from the wheel, and in that said plastic sheet and plastic fibers are non-adhesively bonded to one another. In this case, reuse of the materials is possible by cleavage, i.e., separating the layers, melting the sheet and breaking the web.

Particularly preferred according to the present invention are undershields in which the plastic sheet and the plastic fiber consist of the same thermoplastic material are non-adhesively bonded to one another. However, alternatively, it is also possible to prepare the plastic sheet and plastic fibers of the non-woven from different materials.

To ensure optimum sound-absorbing properties, the plastic sheet is to have a good absorption of structure-borne sound, expressed by a loss factor, which is dimensionless, of from 0.1 to 0.3.

The same applies to the non-woven, but the flow resistance should be from 300 Pa·s/m to 4000 Pa·s/m.

For the same reason, the strength of the plastic sheet is to be selected within a suitable range. The modulus of elasticity of the plastic sheet should preferably have a value of from 50 MPa to 10,000 MPa, preferably from 600 MPa to 1000 MPa.

An additional insulating effect is achieved when the plastic sheet has a design which is closed on the side facing towards the wheel and thus seals the wheel housing against the exterior.

It is of particular advantage if the plastic sheet contains thermoplastic materials, especially polyolefin, preferably polypropylene, polyethylene terephthalate, polyethylene, polybutylene terephthalate and/or polyamide.

In a further embodiment, this plastic sheet has a weight per unit area of from 300 to 9000 g/m$^2$, especially from 500 to 2000 g/m$^2$.

The non-woven may preferably consist of needle-punched fibers containing polypropylene or polyethylene terephthalate. It is of particular advantage if the non-woven (needle-punched web) has a weight per unit area of from 100 to 5000 g/m$^2$, preferably from 500 to 1500 g/m$^2$.

Thus, the non-woven (needle-punched web) additionally acts as an absorber for sound which impinges on the undershield and comes from the interior from the side facing away from the wheel. By the closed surface of the water-repellent sheet on the side facing towards the wheel, the sound is again reflected, and thus, individual noise frequencies which are particularly disturbing can be eliminated by selectively choosing the thickness of the non-woven layer through the relationship $\lambda/4=d$ and change of the flow resistance of the non-woven. Here, $\lambda$ represents the frequency of the sound occurring, and d represents the thickness of the non-woven layer.

In a further embodiment, the vehicle undershield has a structure with recesses in the region lying behind the wheel, especially a groove-like structure running in parallel with the direction of rotation of the wheel, for example, in the form of V-shaped grooves which have such a design that a transversal acceleration is applied to the impinging spray water to be dissipated. In this way, the formation of spray mist when driving an a road surface wet from rain is effectively suppressed.

The invention claimed is:

1. A vehicle undershield which is essentially conformed to the shape of the wheel housing and attached thereto, consisting of two layered structures including a water-repellent impermeable self-supporting plastic sheet on the side facing towards the wheel, and an adjacently positioned non-woven made of plastic fibers in direct contiguous contact with said self-supporting plastic sheet on a side of said plastic sheet facing away from the wheel.

2. A vehicle undershield according to claim 1, characterized in that said plastic sheet and plastic fibers are non-adhesively bonded to one another.

3. The vehicle undershield according to claim 1, characterized in that said plastic sheet and plastic fibers are of the same material.

4. The vehicle undershield according to claim 3, characterized in that said same material is thermoplastic.

5. The vehicle undershield according to claim 1, characterized in that said plastic sheet and plastic fibers are of different materials.

6. The vehicle undershield according to claim 1, characterized in that said plastic sheet contains polypropylene, polyethylene terephthalate, polyethylene, polybutylene terephthalate, polyamide or combinations thereof.

7. The vehicle undershield according to claim 1, characterized in that said non-woven has a flow resistance of from 300 Pa·s/m to 4000 Pa·s/m.

8. The vehicle undershield according to claim 1, characterized in that said plastic sheet has a loss factor of from 0.1 to 0.3.

9. The vehicle undershield according to claim 1, characterized in that said plastic sheet has a modulus of elasticity of from 50 MPa to 10,000 MPa.

10. The vehicle undershield according to claim 1 characterized in that said plastic sheet is closed at least on the side facing toward the wheel.

11. The vehicle undershield according to claim 1, characterized in that said plastic sheet has a weight per unit area of from 300 to 9000 $g/m^2$.

12. The vehicle undershield according to claim 1 characterized in that said non-woven is a needle-punched web.

13. The vehicle undershield according to claim 1, characterized in that said non-woven consists of needle-punched fibers of polypropylene, polyethylene terephthalate, polyethylene, polybutylene terephthalate, polyamide or a combination thereof.

14. The vehicle undershield according to claim 13, characterized in that said non-woven has a weight per unit area of from 100 to 5000 $g/m^2$.

15. The vehicle undershield according to claim 1, characterized by having a structure with recesses in the region lying behind the wheel for dissipating water.

16. The vehicle undershield according to claim 15, characterized in that said recesses are in the form of v-shaped grooves running in parallel to the direction of rotation of the wheel.

17. The vehicle undershield according to claim 1, characterized in that said plastic sheet has a modulus of elasticity of from 600 MPa to 1000 MPa.

18. The vehicle undershield according to claim 1, characterized in that said plastic sheet has a weight per unit area of from 500 to 2000 $g/m^2$.

19. The vehicle undershield according to claim 1, characterized in that said non-woven has a weight per unit area of from 500 to 1500 $g/m^2$.

20. The vehicle undershield according to claim 1, characterized in that said non-woven is sound absorbing.

* * * * *